United States Patent
Huang et al.

(10) Patent No.: US 8,531,339 B2
(45) Date of Patent: Sep. 10, 2013

(54) HAND-HELD ELECTRONIC DEVICE

(75) Inventors: Lin-Chin Huang, Taoyuan County (TW); Chia-Yan Hsu, Taoyuan County (TW); Kuo-Chuan Liao, Taoyuan County (TW); Ming-Chun Huang, Taoyuan County (TW)

(73) Assignee: HTC Corporation, Taoyuan (TW)

( * ) Notice: Subject to any disclaimer, the term of this patent is extended or adjusted under 35 U.S.C. 154(b) by 246 days.

(21) Appl. No.: 13/015,881

(22) Filed: Jan. 28, 2011

(65) Prior Publication Data
US 2011/0291897 A1 Dec. 1, 2011

(30) Foreign Application Priority Data
Jun. 1, 2010 (TW) ............................... 99117548 A

(51) Int. Cl.
*H01Q 1/24* (2006.01)
(52) U.S. Cl.
USPC .......................................... 343/702; 343/904
(58) Field of Classification Search
USPC ................... 343/702, 904; 455/575.1, 575.8; 379/433.01, 433.08
See application file for complete search history.

(56) References Cited

U.S. PATENT DOCUMENTS

| | | | |
|---|---|---|---|
| 8,188,930 B2 * | 5/2012 | Sung et al. ..................... | 343/702 |
| 2007/0057852 A1 * | 3/2007 | Leizerovich et al. ......... | 343/702 |
| 2008/0174420 A1 | 7/2008 | Hsu et al. | |
| 2009/0005117 A1 | 1/2009 | Bashan et al. | |
| 2010/0188300 A1 * | 7/2010 | Anguera et al. .............. | 343/702 |
| 2011/0148718 A1 * | 6/2011 | Wang et al. ................... | 343/702 |

FOREIGN PATENT DOCUMENTS

| | | |
|---|---|---|
| CN | 101291153 A | 8/2008 |
| TW | M265773 | 5/2005 |
| TW | 200832129 A | 8/2008 |
| TW | 201018180 A | 5/2010 |

* cited by examiner

*Primary Examiner* — Hoanganh Le
(74) *Attorney, Agent, or Firm* — Birch, Stewart, Kolasch & Birch, LLP

(57) ABSTRACT

An electronic device is provided, including a main body, a battery detachably received in the main body, a stopper disposed in a predetermined position to restrict the battery in the main body, an antenna disposed on the stopper, and a cover connected with the stopper and movable relative to the stopper between a first position and a second position. When the cover is in the first position, the cover is engaged with the main body and restricts the stopper in the predetermined position. When the cover is moved from the first position along a first direction to the second position, the cover is disengaged from the main body, and the stopper is releasable from the predetermined position along a second direction.

10 Claims, 4 Drawing Sheets

HAND-HELD ELECTRONIC DEVICE

CROSS REFERENCE TO RELATED APPLICATIONS

This Application claims priority of Taiwan Patent Application No. 099117548, filed on Jun. 1, 2010, the entirety of which is incorporated by reference herein.

BACKGROUND OF THE INVENTION

1. Field of the Invention

This application relates in general to an electronic device and in particular to an electronic device preventing from instant power-off.

2. Description of the Related Art

Conventional portable electronic device, such as mobile phones or smart phones, usually comprises a chargeable battery therein. When replacing the battery, the user has to detach a back cover from the portable electronic device in advance. However, the battery may fall off and cause functional failure due to instant power-off when the back cover is removed. To solve the aforesaid problem, the mechanical design of electronic devices has become a critical issue.

BRIEF SUMMARY OF INVENTION

This application provides an electronic device, including a main body, a battery detachably received in the main body, a stopper disposed in a predetermined position to restrict the battery in the main body, an antenna disposed on the stopper, and a cover connected with the stopper and movable relative to the stopper between a first position and a second position. When the cover is in the first position, the cover is engaged with the main body and restricts the stopper in the predetermined position. When the cover is moved from the first position along a first direction to the second position, the cover is disengaged from the main body, and the stopper is releasable from the predetermined position along a second direction.

BRIEF DESCRIPTION OF DRAWINGS

The invention can be more fully understood by reading the subsequent detailed description and examples with references made to the accompanying drawings, wherein.

DETAILED DESCRIPTION OF INVENTION

Figure 1:
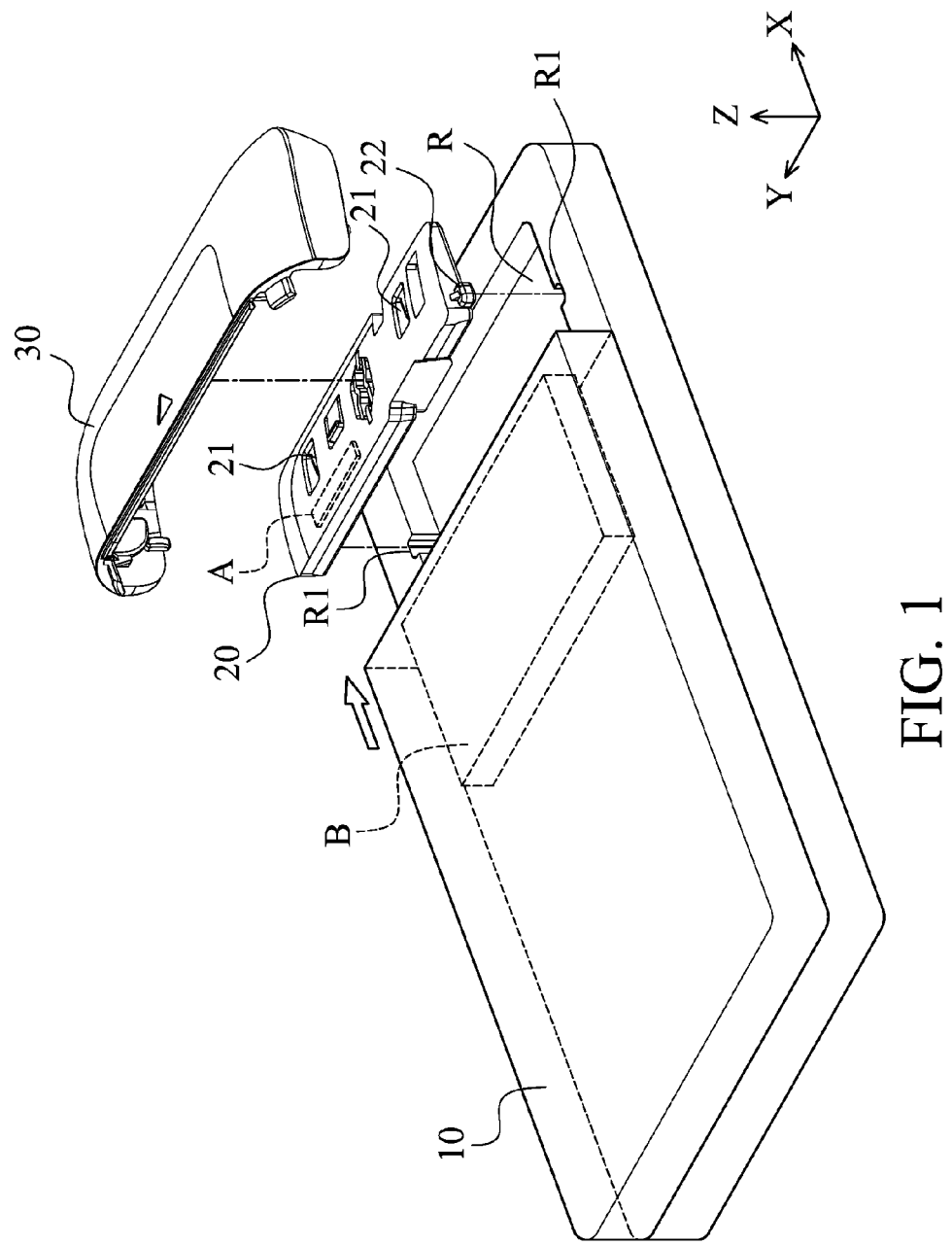
FIG. 1 is a perspective diagram of an electronic device according to an embodiment of the invention.

Referring to FIG. 1, an embodiment of an electronic device, such as mobile phones or smart phones, primarily comprises a main body 10, a stopper 20, a cover 30, and an antenna A embedded on the stopper 20, and a battery B detachably received in the main body 10. In this embodiment, the stopper 20 and the cover 30 comprise plastic material and are movably connected with each other. As shown in FIG. 1, the stopper 20 forms two protrusions 22, and the main body 10 forms a recess R with two slots R on opposite sides thereof.

During assembly, the stopper 20 is disposed in a predetermined position of the recess R with the protrusions 22 respectively positioned in the slots R. It is noted the stopper 20 is restricted in the recess R and cannot move along the X direction (first direction).

Figure 2:
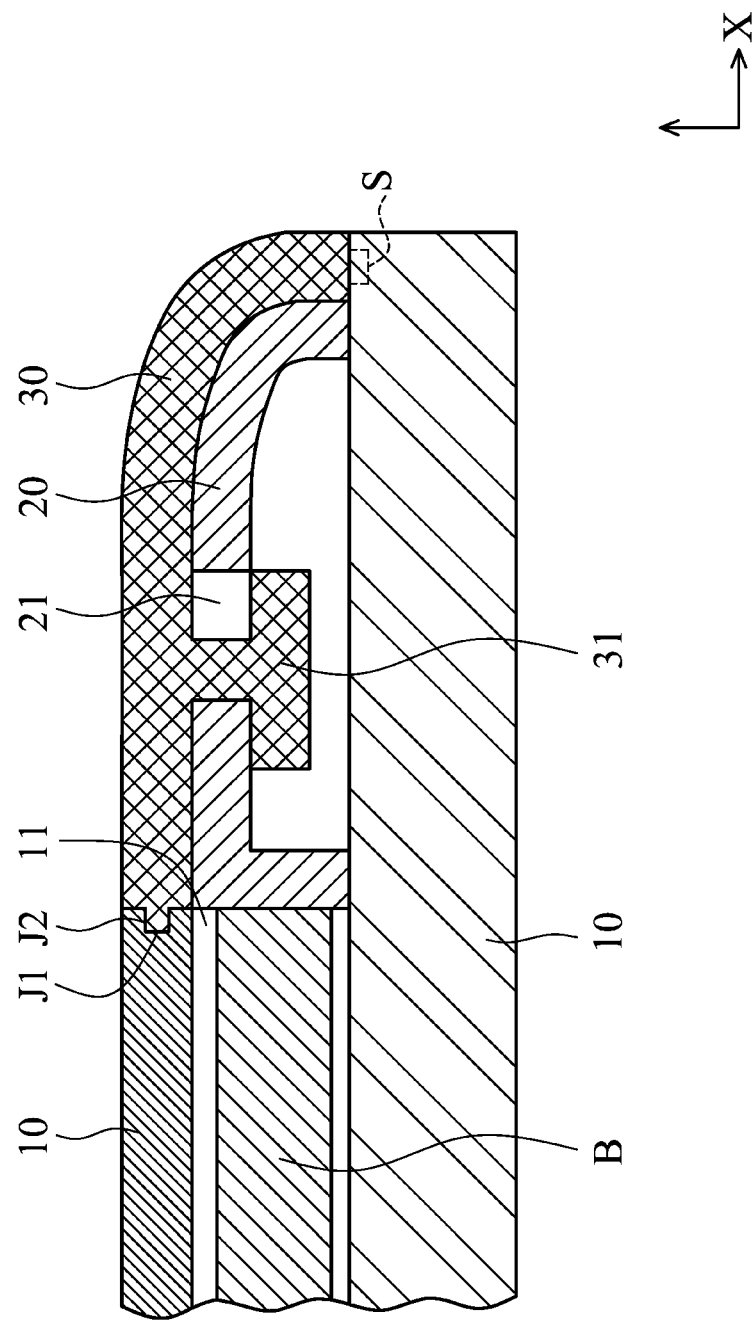
FIG. 2 is a sectional view of an electronic device when in normal use according to an embodiment of the invention.

Referring to FIG. 2, when the electronic device is assembled for normal usage, the cover 30 is situated in a first position above the stopper 20. Here, a first joining portion J1 of the main body 10 is engaged with a second joining portion J2 of the cover 30, so as to restrict the stopper 20 in the predetermined position of the recess R. As shown in FIG. 2, a sliding portion 31 of the cover 30 is disposed through a hole 21 of the stopper 20, wherein the stopper 20 abuts the battery B to prevent the battery B from popping out of the main body 10 through the opening 11.

Figure 3:
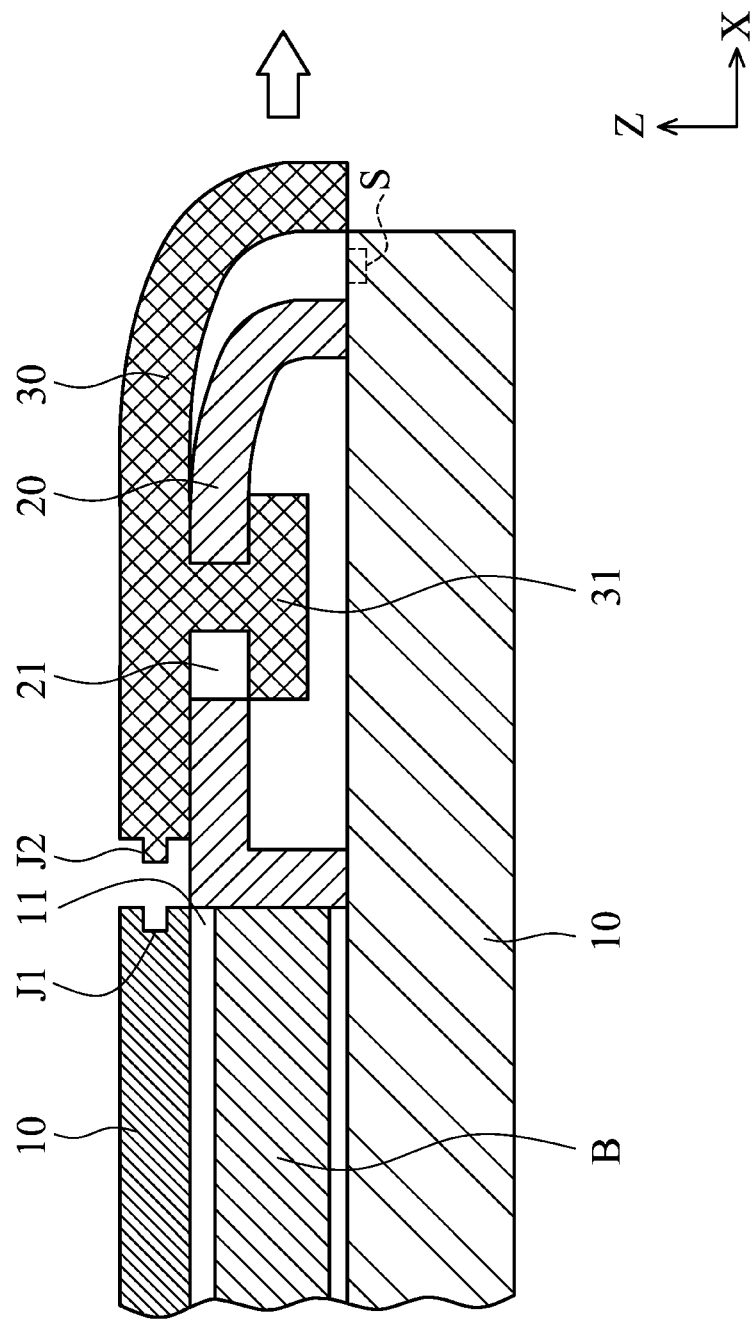
FIG. 3 is a sectional view of a cover sliding to a second position relative to a stopper of an electronic device according to an embodiment of the invention.

Before releasing the battery B, as shown in FIG. 3, the cover 30 is pulled out relative to the stopper 20 along the X direction. A sensor S on the main body 10 can transmit an electrical signal to a processing circuit in the main body 10 when detecting that the cover 30 has separated from the main body 10. Thus, the electronic device can be timely shut off. During sliding of the cover 30 relative to the stopper 20 from the first position to a second position, as shown in FIG. 3, the sliding portion 31 of the cover 30 moves in the hole 21, and the first and second joining portions J1 and J2 are separated from each other, such that the cover 30 is released from the main body 10. In this state, the stopper 20 keeps in contact with the battery B along the X direction, so as to prevent the battery B from popping out of the main body 10 through the opening 11.

Figure 4:
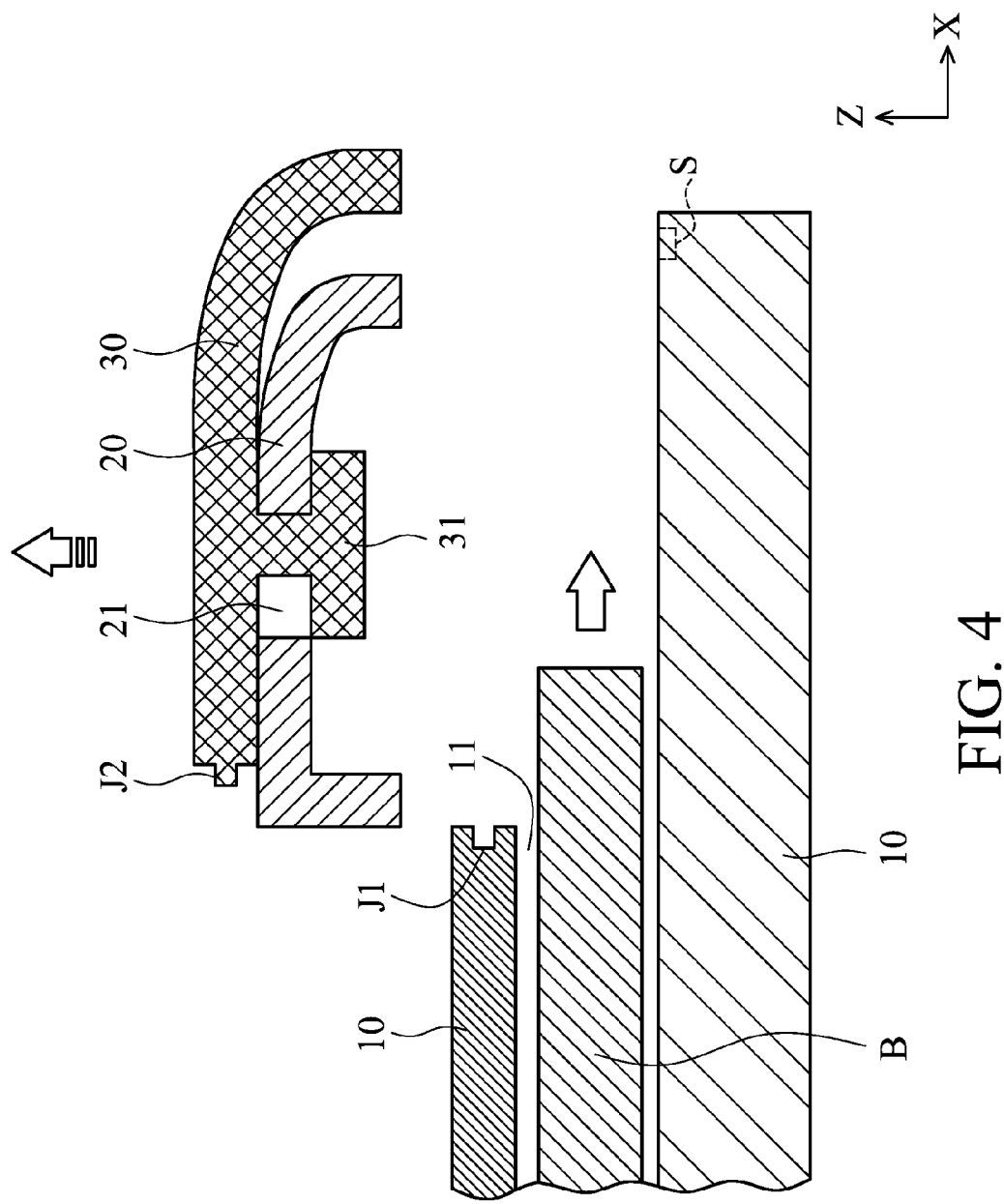
FIG. 4 is a sectional view of a cover and a stopper detached from a main body of an electronic device according to an embodiment of the invention.

Referring to FIG. 4, as the cover 30 slides relative to the stopper 20 to the second position, the cover 30 and the stopper 20 can be removed from the main body 10 along the Z direction (second direction). In this embodiment, the sliding portion 31 of the cover 30 through the stopper 20 has a T-shaped cross-section. Since the sliding portion 31 is fastened through the stopper 20, the stopper 20 can be removed with the cover 30 to be released from the recess R, as shown in FIG. 4. When the stopper 20 and the cover 30 are detached from the main body 10, the battery B can be taken out of the main body 10 through the opening 11.

In the state of FIG. 3, as the battery B is still blocked by the stopper 20 and held in the main body 10 when the cover 30 slides to the second position, the electronic device will not lose power and instantly cause functional failure. Furthermore, since the antenna A is disposed on the stopper 20 instead of the main body 10, as shown in FIG. 1, space within the main body 10 can be saved for accommodating other interior components.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation to encompass all such modifications and similar arrangements.

What is claimed is:

1. An electronic device, comprising:

a main body;

a battery, detachably received in the main body;

a stopper, disposed in a predetermined position on the main body to restrict the battery in the main body;

an antenna, disposed on the stopper; and a cover, connected with the stopper and movable relative to the stopper between a first position and a second position, wherein when the cover is in the first position, the cover is engaged with the main body and restricts the stopper in the predetermined position, wherein when the cover is moved relative to the stopper from the first position along a first direction to the second position, the cover is disengaged from the main body, and the stopper is releasable from the predetermined position along a second direction.

2. The electronic device as claimed in claim 1, wherein the stopper has a hole, and the cover has a sliding portion movably disposed through the hole.

3. The electronic device as claimed in claim 2, wherein the sliding portion has a T-shaped cross-section.

4. The electronic device as claimed in claim 1, wherein the second direction is perpendicular to the first direction.

5. The electronic device as claimed in claim 1, wherein the electronic device further comprises a sensor disposed on the main body, and wherein the sensor transmits an electric signal to the main body to power-off the electronic device when the cover slides to the second position with respect to the stopper.

6. The electronic device as claimed in claim 1, wherein the main body has an opening; wherein when the stopper is released from the predetermined position, the battery is released from the main body through the opening.

7. The electronic device as claimed in claim 1, wherein the main body has a recess, and the stopper is received in the recess and contacts the battery to prevent the battery from being released from the main body.

8. The electronic device as claimed in claim 1, wherein the recess has a slot, and the stopper has a protrusion engaged in the slot to prevent the stopper from moving along the first direction.

9. The electronic device as claimed in claim 1, wherein the stopper comprises plastic material.

10. The electronic device as claimed in claim 1, wherein the cover comprises plastic material.

* * * * *